M. CRUMP.
CAKE MIXER.
APPLICATION FILED AUG. 28, 1913.
1,103,271. Patented July 14, 1914.
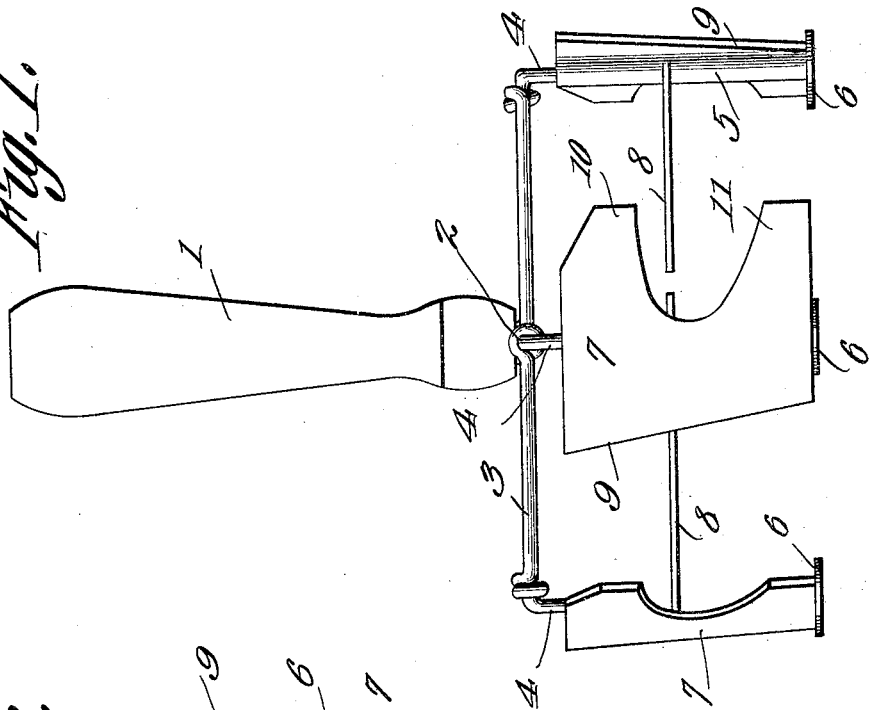
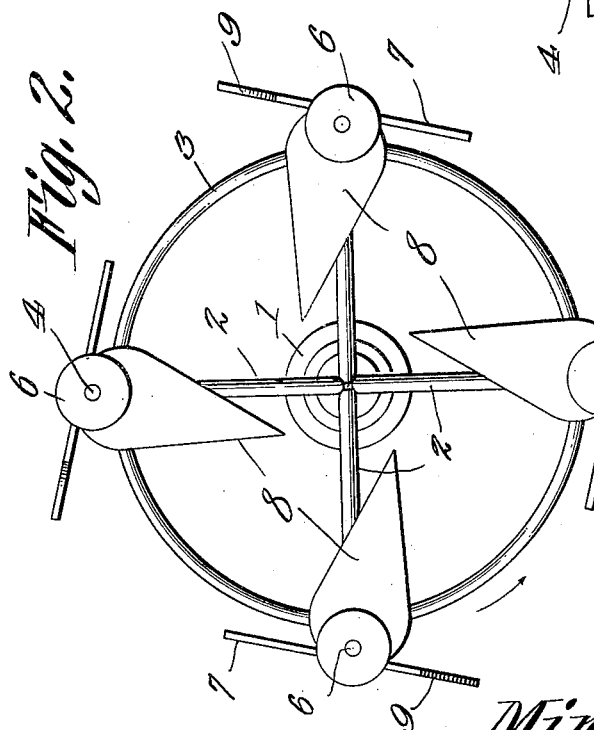
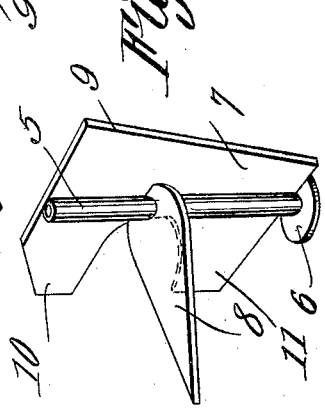
Witnesses
Minnie Crump, Inventor,
by C. A. Snow & Co.
Attorneys.

UNITED STATES PATENT OFFICE.

MINNIE CRUMP, OF PINEVILLE, KENTUCKY.

CAKE-MIXER.

1,103,271.  Specification of Letters Patent.  Patented July 14, 1914.

Application filed August 28, 1913. Serial No. 787,184.

*To all whom it may concern:*

Be it known that I, MINNIE CRUMP, a citizen of the United States, residing at Pineville, in the county of Bell and State of Kentucky, have invented a new and useful Cake-Mixer, of which the following is a specification.

The present invention relates to improvements in cake mixers, the present device being adapted for use in mixing doughs of all kinds, batters and the like, in a culinary department, one object of the present invention, being the provision of means adapted to be disposed within the batter or dough to be mixed and such means when rotated, to properly commingle all of the ingredients and at the same time remove any portion that clings to the sides or bottom of the utensil, the ingredients being caused to move from the outer periphery of the utensil toward the center, thereby thoroughly commingling the same.

A further object of the present invention, is the provision of a device of this character which is very easily cleaned and which will rapidly commingle the ingredients to produce the desired mixture of the same.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a side elevation of the complete device. Fig. 2 is a bottom plan view thereof. Fig. 3 is an inner perspective view of one of the mixing and scraping devices *per se*.

Referring to the drawings, the numeral 1 designates the handle 1, which carries the four radiating arms 2 fixed rigidly thereto, so that when the member 1 is rotated, the arms 2 will rotate and also carry therewith, the circular frame or ring 3.

Extending from the ring 3 adjacent each arm 2, are the pins or rods 4, each of which constitutes a support for its respective mixing and scraping member, the detail of which is clearly shown in Fig. 3. Each one of the mixing and scraping members, includes a sleeve 5, which is secured rigidly to its supporting rod 4 and carries upon its lower end a disk 6, which is disposed to rest upon and scrape the bottom of the utensil during the rotation of the present mixer. These disks 6 also constitute a foot rest for the complete mixer, so that when the same is in the position as shown in Fig. 1, they will constitute a support for the mixer.

A flat plate 7 is carried by the sleeve 5 and is provided with the scraping or cutting blade 9, which is disposed at a slight angle, as clearly shown in Fig. 1, but due to the incline of the plate 7 engages the wall of the receptacle containing the material to be mixed, and scrapes the same, the incline of the plate tending to move the ingredients inwardly toward the center of the frame 3, the two spaced members 10 and 11 of the plate 7 constituting a guiding means to assist in guiding the material toward the center.

Carried by the sleeve 5 intermediate of its ends and having one end projecting inwardly is a blade 8, which is slightly ovate in shape, with its apex projected inwardly of the frame. Thus, when the mixer is moved in the direction of the arrow, as shown in Fig. 2, the scraping edge 9 of the blade 7 will cause the material to be moved inwardly due to the angularity thereof which is a slight tangent to the ring 3, while the blade 8 will receive the inrushing ingredients and cut through the same so as to cut the material in a horizontal plane in a line centrally between the reduced ends 10 and 11 of the blade 7. The disks 6 ride upon and close to the bottom of the receptacle and due to the rotary action of the mixer, cut the material from the bottom so as to completely scrape the same and prevent any adherence.

What is claimed is:

1. A device of this character, including a supporting frame having a plurality of depending rods, a plurality of spacing and mixing members, one carried by each rod, each of said members including a blade carried by the rod and provided with an outwardly extending scraping edge and an inwardly extending guiding portion, said inwardly extending guiding portion having two spaced terminals, and a scraping disk mounted upon the lower end of the rod.

2. A device of this character, including a supporting frame having a plurality of depending rods, a plurality of scraping and mixing members, one carried by each rod, each of said members including a blade disposed exteriorly of the rod and provided with an outwardly extending scraping edge and an inwardly extending guiding portion, said inwardly extending guiding portion having two spaced terminals, and a scraping disk mounted upon the lower end of the rod.

3. A device of this character, including a supporting frame having a plurality of depending rods, a plurality of scraping and mixing members, one carried by each rod, each of said members including a blade disposed exteriorly of the rod and provided with an outwardly extending scraping edge and an inwardly extending guiding portion, said inwardly extending guiding portion having two spaced terminals, a scraping disk mounted upon the lower end of the rod, and an agitating member disposed intermediate of the ends of the rod and extending inwardly out of radial alinement with the frame.

4. A device of this character, including a supporting frame having a plurality of depending rods, a plurality of scraping and mixing members, one carried by each rod, each of said members including a blade disposed exteriorly of the rod and provided with an outwardly extending scraping edge and an inwardly extending guiding portion, said inwardly extending guiding portion having two spaced terminals, a scraping disk mounted upon the lower end of the rod, an agitating member disposed intermediate of the ends of the rod and extending inwardly out of radial alinement with the frame, the latter member consisting of an ovate shaped plate with the apex disposed inwardly of the frame.

5. A device of this character, including an annulus, a plurality of radiating arms connected thereto and having each a depending rod, a handle connected centrally of the arms to rotate the device, and a plurality of scraping and mixing members, one mounted upon each depending rod, each one of said members consisting of three plates, one mounted upon the lower end of each rod, another disposed intermediate the ends of the rods and projecting toward the center of the annular member, and a vertical plate mounted upon the outer face of the rod.

In testimony that I claim the foregoing as my own, I have hereto affixed my signature in the presence of two witnesses.

MINNIE CRUMP.

Witnesses:
  A. B. GILBERT,
  A. M. KELLY.

---

Copies of this patent may be obtained for five cents each, by addressing the "Commissioner of Patents, Washington, D. C."